US006781084B2

(12) United States Patent
Brockman et al.

(10) Patent No.: US 6,781,084 B2
(45) Date of Patent: Aug. 24, 2004

(54) APPARATUS AND METHOD FOR BRAZING

(75) Inventors: Howard Brockman, Liberty Township, OH (US); Christopher Britton, Hamilton, OH (US)

(73) Assignee: Fuztech, Ltd., Hamilton, OH (US)

( * ) Notice: Subject to any disclaimer, the term of this patent is extended or adjusted under 35 U.S.C. 154(b) by 0 days.

(21) Appl. No.: 10/055,312

(22) Filed: Oct. 26, 2001

(65) Prior Publication Data

US 2003/0080095 A1 May 1, 2003

(51) Int. Cl.[7] .................................................. B23K 1/00
(52) U.S. Cl. .............................. 219/85.15; 219/85.14; 219/85.19
(58) Field of Search .......................... 219/85.15, 85.14, 219/85.22, 490

(56) References Cited

U.S. PATENT DOCUMENTS

| | | | |
|---|---|---|---|
| 651,597 A | 6/1900 | Eyre | |
| 3,263,057 A | * 7/1966 | Conti | 219/85.14 |
| 3,440,389 A | * 4/1969 | Meyer | 219/85.14 |
| 3,790,738 A | * 2/1974 | Laub et al. | 219/85.19 |
| 4,224,496 A | 9/1980 | Riordan et al. | 219/110 |
| 4,273,983 A | 6/1981 | Ogawa et al. | 219/93 |
| 4,602,148 A | 7/1986 | Ramsey | 219/535 |
| 4,705,937 A | 11/1987 | Marek | 219/497 |
| 4,960,975 A | * 10/1990 | Weinbrecht | 219/85.22 |
| 5,286,945 A | * 2/1994 | Abe | 219/85.19 |
| 5,880,425 A | 3/1999 | Carnes, Jr. et al. | 219/112 |
| 5,902,507 A | 5/1999 | Wiezbowski et al. | 219/615 |
| 6,091,044 A | * 7/2000 | Larranaga et al. | 219/85.14 |

* cited by examiner

Primary Examiner—Clifford C. Shaw
(74) Attorney, Agent, or Firm—Mark F. Smith

(57) ABSTRACT

The present invention is directed to an apparatus and a method for brazing work pieces together and which eliminates the disadvantages associated with conventional apparatus currently in use for brazing parts together. In a preferred embodiment of the invention, the brazing apparatus comprises an electric connector for connecting to an electrical power source; at least two electrodes adapted for attaching to and providing electrical contact with the work pieces to be brazed together; means for converting the electric power being directed from the electrical power source into a low voltage, high current electric flow directed to the work pieces; and a control system for controlling the brazing operation. The brazing apparatus further comprises means for automatically controlling the time duration of the brazing operation and means for monitoring and automatically controlling the brazing temperature being generated along the interface between the work pieces.

20 Claims, 5 Drawing Sheets

APPARATUS AND METHOD FOR BRAZING

BACKGROUND OF THE INVENTION

This invention relates to an apparatus and a method for joining work pieces together and, more particularly, to an apparatus and method for performing resistance brazing utilizing high current and low voltage electric flow with precise temperature control to rapidly heat the interface between the work pieces to create a molten zone of metal which forms a solid weld when cooled.

In the manufacture and construction of many types of structures, brazing has been used to reduce or replace the use of various fastening methods, such as bolting, riveting and the like. Resistance brazing is a well-known process whereby work pieces are joined together by use of electric current that creates heat along the high resistance interface between the work pieces. During the brazing process, a fusible material is inserted along the high resistance interface in order to wet the surfaces of the work pieces and to ensure dissolution of any oxides that may be formed during the brazing operation. A low voltage, high current electric flow is used to rapidly heat the interface causing the fusible material to melt then consolidate and cool to form a brazed joint. In order to properly form the joint, the melted fusible material must wet the entire surface along the interface between the work pieces while maintaining the melting temperature of the fusible material below the melting temperature of the work pieces being joined In order to avoid the undesirable formation of voids, microcracks, and brittle intermetallic compounds, resulting in joints that are weak and exhibit poor resistance to thermal shock, it is important that diffusion and alloying between the fusible material and the work pieces being joined should be kept to a minimum. One problem, which is often associated with subjecting work pieces to high temperature, is the formation of tensile residual stresses created in the work pieces during the brazing process by the expansion and then contraction of the region adjacent to the interface between the work pieces. Such tensile residual stresses are well known to reduce both fatigue life and increase sensitivity to corrosion-fatigue and stress corrosion cracking in a wide variety of materials. Further, where two different work pieces having different sizes are brazed together, any residual stress within the work pieces are amplified due to the difference in their heat capacity.

In order to minimize the formation of such tensile residual stress, it is desirable for brazing to be carried out by heating the interface and the fusible material just above the melting point of the fusible material and cooling immediately after adequate flow and wetting has taken place. It has been found that by careful monitoring and control of the temperature being generated during the brazing process along the interface between the work pieces being joined, it is possible to minimize such detrimental thermal effects.

Accordingly, a need exist for an apparatus for brazing whereby a low voltage, high current electric flow be used to braze work pieces together formed from various materials while monitoring and controlling the temperature along the interface between the work pieces to form a joint having physical properties that are superior to joints formed using conventional brazing apparatus.

SUMMARY OF THE INVENTION

The present invention is directed to an apparatus and a method for brazing work pieces together and which eliminates the disadvantages associated with conventional apparatus currently in use for brazing parts together. In a preferred embodiment of the invention, the brazing apparatus comprises an electric connector for connecting to an electrical power source; at least two electrodes adapted for attaching to and providing electrical contact with the work pieces to be brazed together; means for converting the electric power being directed from the electrical power source into a low voltage, high current electric flow directed to the work pieces; and a control system for controlling the brazing operation. The brazing apparatus further comprises means for automatically controlling the time duration of the brazing operation and means for monitoring and automatically controlling the brazing temperature being generated along the interface between the work pieces.

In another preferred embodiment of the invention, the brazing apparatus further comprises means for permitting the user to manually control the time duration of the brazing operation.

In another preferred embodiment of the invention, the brazing apparatus further comprises means for permitting the user to manually control the brazing temperature being generated along the interface between the work pieces.

In another preferred embodiment of the invention, the control system comprises a programmable controller or microprocessor for controlling the brazing operation.

In another preferred embodiment of the invention, the brazing apparatus comprises means for cooling the electrodes.

In another preferred embodiment of the invention, the brazing apparatus comprises water-cooled electrodes.

In another preferred embodiment of the invention, the brazing apparatus comprises means for allowing work pieces having various heat capacities to be joined together by brazing.

In another preferred embodiment of the invention, the brazing apparatus comprises a plurality of electrodes spaced along the brazing line to provide a uniformed brazing temperature along the interface between the work pieces.

Another preferred embodiment of the invention is a method for brazing at least two work pieces together comprising the steps of inserting a fusible material along the high resistance interface between the work pieces; defining a temperature level to be maintained along the interface during the brazing operation, applying a low voltage, high electric current flow to rapidly heat the interface causing the fusible material to melt, then consolidate and cool to form a brazed joint; wherein the temperature along the interface is monitored and regulated by increasing or decreasing the current flow to maintain the temperature at the predefined level.

In another preferred embodiment of the invention, the method for brazing further comprises the step of terminate the brazing operation after a predefined time.

A primary object of this invention, therefore, is to provide an apparatus for brazing together work pieces such that the brazed joint has improved physical properties over brazed joints formed using other conventional brazing apparatus.

Another primary object of the invention is to provide and apparatus for brazing which can be used to braze together temperature sensitive parts.

Another primary object of the invention is to provide an apparatus for brazing together work pieces that reduces or eliminates the formation of tensile residual stresses typically produced during conventional brazing processes.

Another primary object of the invention is to provide an apparatus for brazing together work pieces that reduces or eliminates the formation of voids, microcracks, and brittle intermetallic compounds.

Another primary object of the invention is to provide an apparatus for brazing together work pieces that eliminates or reduces the formation of joints that are weak and exhibit poor resistance to thermal shock.

Another primary object of the invention is to provide an apparatus for brazing together work pieces having different heat capacities.

Another primary object of the invention is to provide an apparatus for brazing together work pieces having variable dimensions.

Another primary object of the invention is to provide an apparatus for brazing together a plurality of work pieces together.

Another primary object of this invention is to provide an apparatus for brazing that is relatively inexpensive to manufacture.

Another primary object of this invention is to provide an apparatus for brazing that is relatively inexpensive to operate and maintain.

Another primary object of this invention is to provide an apparatus which is relatively lightweight and portable.

Other objects and advantages of the invention will be apparent from the following description, the accompanying drawings and the appended claims.

DETAILED DESCRIPTION OF THE PREFERRED EMBODIMENT

Figure 1:
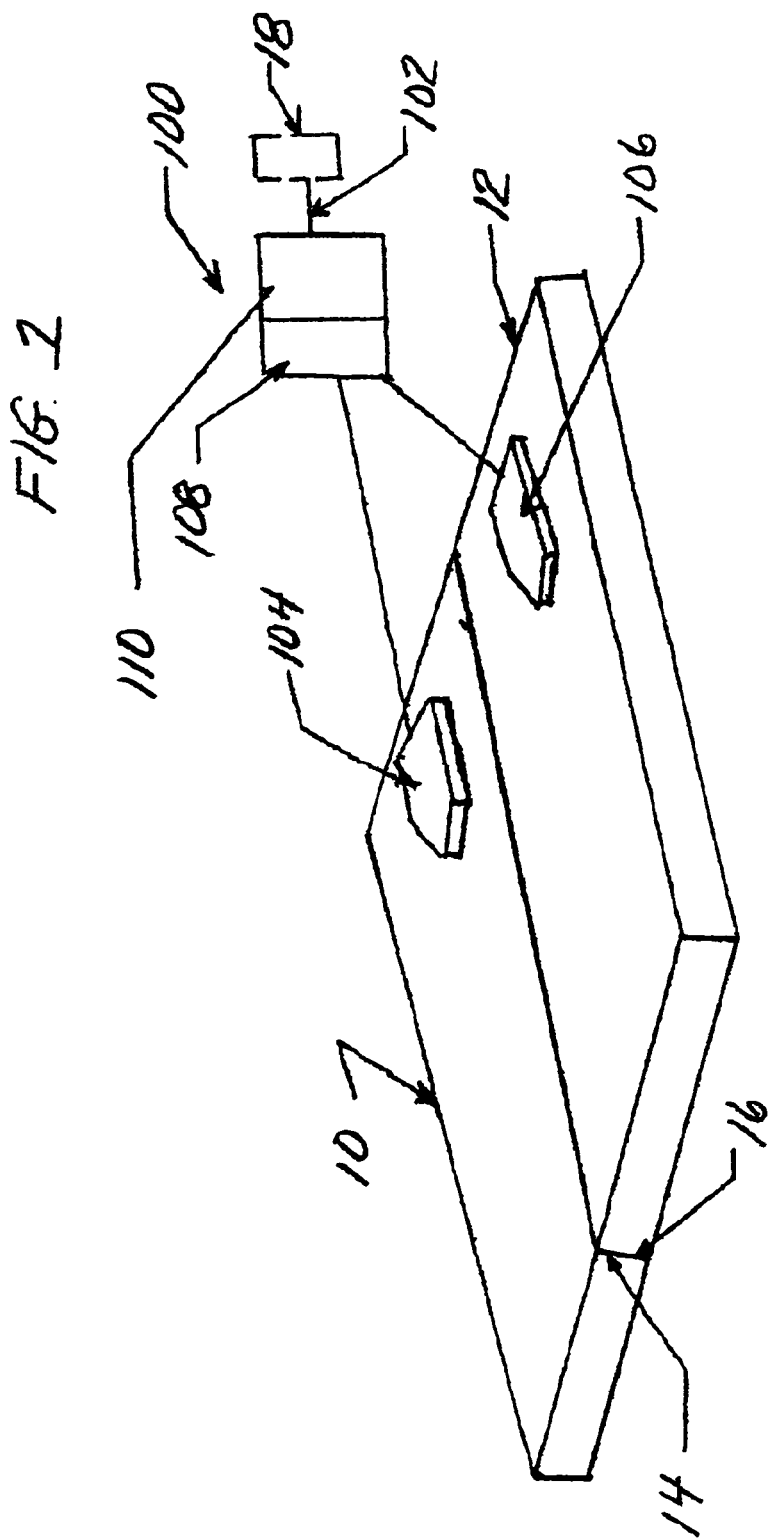
FIG. 1 is a perspective view of a pair of work pieces to be joined together by the brazing apparatus of the present invention.

The present invention is directed to brazing and more particulary to a high resistance brazing apparatus which utilizes low voltage, high current electric flow and which precisely regulates the brazing time and temperature along the interface between the work pieces being brazed together thereby improving the physical properties of the formed brazed joint. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
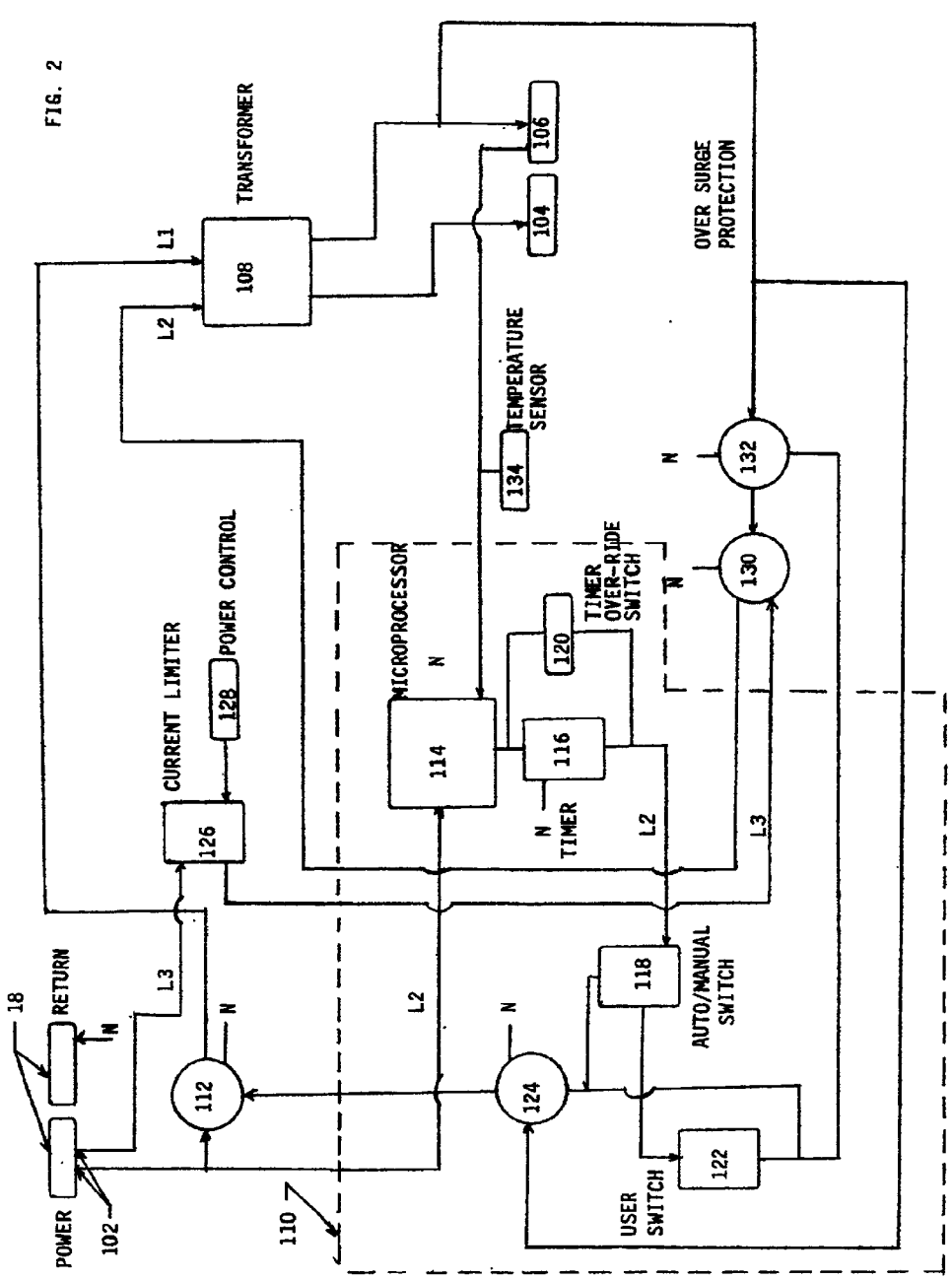
FIG. 2 is a block circuit diagram of a preferred embodiment of the brazing apparatus of the present invention showing the power source, at least two electrodes; the transformer for converting electric power from the power source into a low voltage, high current electric flow; and a control system for controlling the brazing operation.

Referring to FIGS. 1 and 2, a pair of work pieces 10, 12 having opposing ends 14, 16, respectively, are positioned to be mated together by brazing. The brazing apparatus 100 of the present invention is shown schematically and comprises an electric connector 102 for connecting to a conventional electrical power source 18; at least two electrodes 104, 106 adapted for conventionally attaching to and providing electrical contact with the work pieces 10, 12 to be brazed; a device, such as a transformer 108, as shown, for converting the electric power being directed from the electrical power source 18 into a low voltage, high electric current flow; and a control system 110 for controlling the brazing operation.

With this general description of the brazing apparatus 100 of the present invention, it will be useful to begin the detailed description of the electric circuit of the brazing apparatus 100. The brazing apparatus 100 operates by providing power from the power source 18 and the electrical connectors 102 along three interconnected pathways, generally designated L1, L2 and L3, such that the desired low voltage, high amperage electric current flow is achieved for performing the desired brazing operation.

As shown, the first electric path, designated L1, directs electric power from the electric power source 18 through the electrical connector 102 to a grounded first solid-state relay 112. Electric power is then directed from the output side of the first solid-state relay 112 which, when energized, directs the electric power along the first electric path L1 to the input terminal of the transformer 108. As will be discussed later, the transformer 108 operates to change the voltage and amperage of the electric power entering the transformer 108 into the appropriate low voltage, high amperage output which is transmitted to the work pieces 10, 12 through electrodes 104 and 106 for brazing the opposing ends 14 and 16 of the work pieces 10, 12 together.

As shown, the second electric path U directs power from the power source 18 to the control system 110. As previously stated, the control system 110 includes a conventional programmable controller or microprocessor 114 that provides a control signal along the second electric path L2 to activate a conventional timer 116. As will be seen, the timer 116 operates to precisely regulate the amount of time that the low voltage, high amperage electric power is directed from the transformer 108 to the electrodes 104 and 106. The control system 110 is further provided with an auto/manual switch 118 to permit the brazing apparatus 100 to operate either in a manual mode or in an automatic mode of operation. As shown, the second electric path L2 directs electric power to the microprocessor 114 that activates the timer 116 by a low voltage output control signal directed along the second electric path L2 to the input terminal of the timer 116. The timer 116, when activated, then permits the low voltage control signal to continue along the second electric path L2 to the auto/manual switch 118. As shown, the second electric path U is provided with an override switch 120 which when closed operates to permit the control signal from the microprocessor 114 to bypass the timer 116 and go directly to the auto/manual switch 118 thus permitting the user to manually control the time duration of the brazing operation.

In operation, when the auto/manual switch 118 is set in "manual mode," the low voltage control signal is directed along the second electric path L2 to a conventional user switch 122, such as a foot pedal, then to a second grounded solid-state relay 124. The second solid-state relay 124, when energized by the low voltage control signal traveling along the second electric path L2, directs the low voltage signal to the first solid-state relay 112 to activate or deactivate the relay 112 to send or shut of the flow of electric power along the first electric path L1 to the transformer 108. It should now be apparent to those skilled in the art that in this way the user switch 122 permits the user to control the brazing operation, either manually or automatically, by activating or deactivating the first solid-state relay 112 thus controlling the power going to the transformer 108. When the auto/manual switch 118 is set in "auto mode," the control signal is automatically directed along the second electric path L2 to the second solid-state relay 124 bypassing the user switch 122. When activated either manually by the user or automatically by the auto/manual switch 118, the second solid state relay 124 is responsible for providing the low voltage control signal to the first solid-state relay 112 to activate the relay 112 and direct electric power along the first electric path L1 to the transformer 108.

Power from the power source 18 is also directed along the third electric path L3 to the input terminal of a silicon-controlled rectifier (SCR) 126 that operates to limit the electric current to the transformer 108. The current level being limited by the SCR 126 can be adjusted using a conventional potentiometer 128, as shown, or by use of the programmable controller or microprocessor 114. Electric current from the SCR 126 is directed along the third electric path L3 to a third grounded solid-state relay 130 which when activated, directs the electric current to a second input terminal of the transformer 108. As shown, the output from the transformer 108 is directed to at least one pair of electrodes 104, 106 which are electrically coupled to respective grounded work pieces 10 and 12. Over surge protection is provided by directing a low voltage output from the transformer 108 to the input terminal of a forth grounded sold-state relay 132 which, when activated, electrically couples the low voltage output from the user switch 122 to the third solid-state relay 130 to deactivate the relay 130 and cut electric power from flowing along the third electric path L3 to the transformer 108. In case of electric over surge, the low voltage output from the transformer 108 is also directed to the second solid-state relay 124 to deactivate the relay 124 and cut the low voltage control signal being directed along the second electric path L2 to the first solid-state relay 112 thereby deactivating the relay 112 and cutting electric power from flowing along the first electric path L1 to the transformer 108.

The control system 110 is also provided with a conventional temperature sensor 134, such as an infrared sensor, thermocouple, or any other temperature sensing devices conventionally used to measure metal temperature, which provides a sensor input to the microprocessor 114. The microprocessor 114 operates to calculate the temperature of the interface between the work pieces to monitor and precisely regulate the temperature. When the temperature along the interface exceeds a predefined level, the microprocessor functions to cut electric flow to the transformer 108, by cutting off the electric control signal being directed along the second electric path L2 from the microprocessor 114. The control system 110 is also provided with a temperature override permitting the user to override the sensor input from the temperature sensor 134 to permit the brazing operation to continue even if the defined temperature level along the interface between the work pieces 10, 12 is exceeded.

Figure 3:
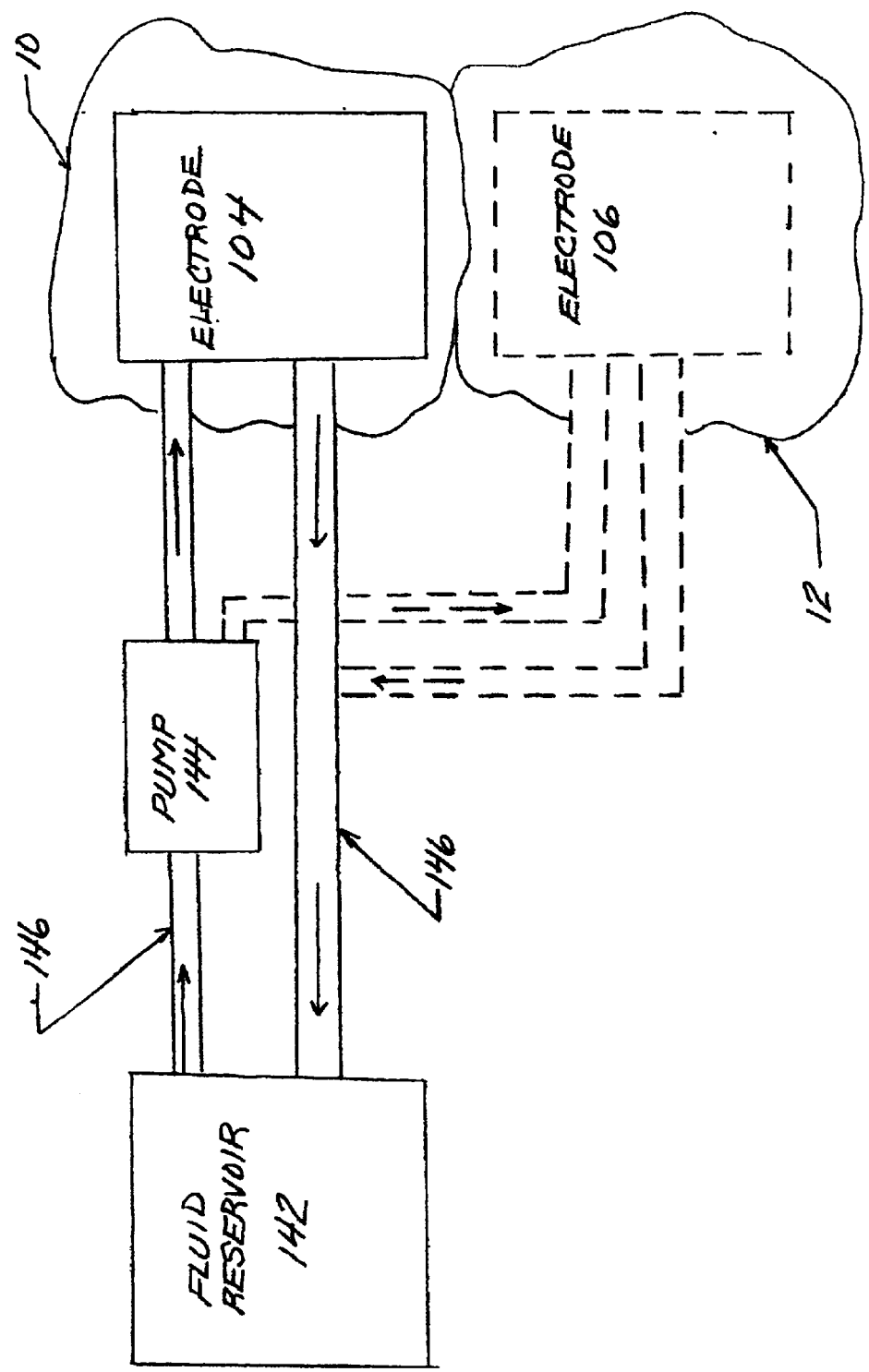
FIG. 3 is a schematic diagram illustrating a pair of electrodes of the present invention electrically connected to a pair of work pieces and having a fluid cooling system.
Figure 4:
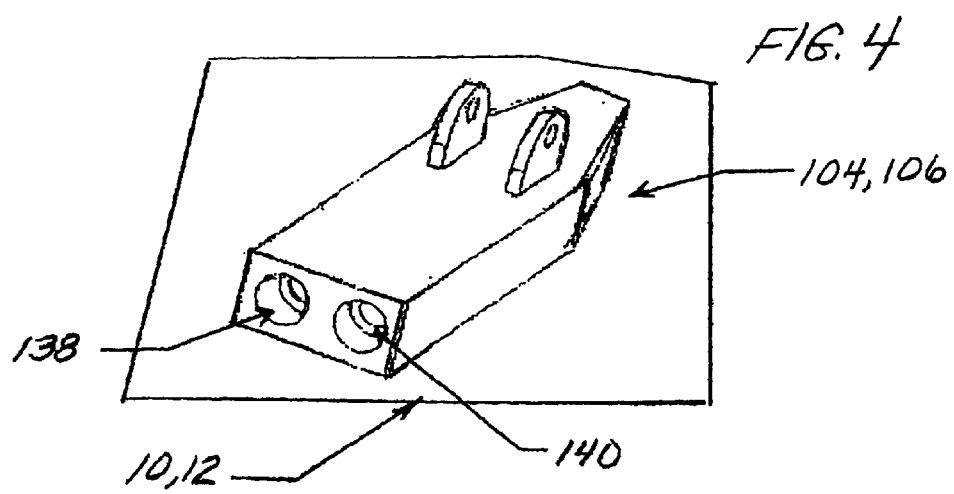
FIG. 4 is a top perspective view of an electrode of the present invention.
Figure 5:
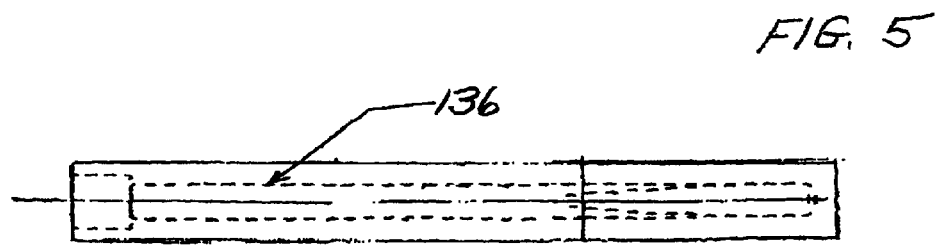
FIG. 5 is a side elevation view of the electrode of FIG. 4.
Figure 6:
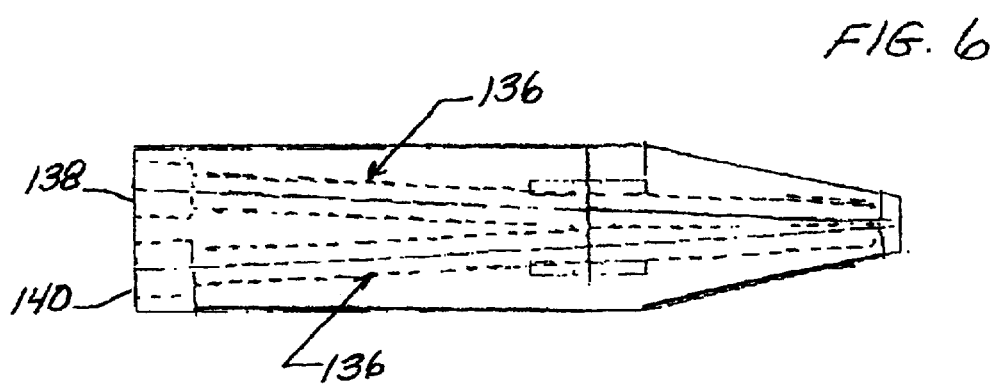
FIG. 6 is a top view of the electrode of FIG. 4.
Figure 7:
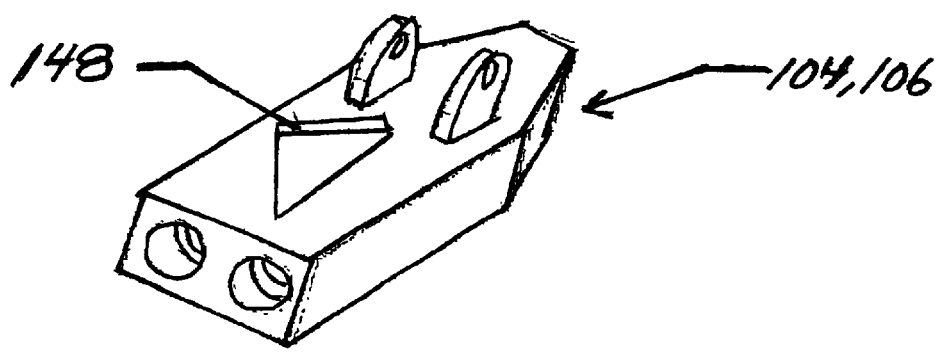
FIG. 7 is another view of the electrode of the present invention showing a cooling fin.

Referring to FIGS. 3 though 6, a pair of electrodes 104 and 106 is schematically shown electrically connected to the work pieces 10 and 12 that are to be joined together by brazing. Each electrode 104,106 is formed from a high conductive material, such as copper, silver, and the like. In a preferred embodiment of the invention, heat buildup in the electrodes 104, 106 is minimized by use of cooling fluid, such as water. Preferably, the electrodes include an inner flow channel 136 having an inlet 138 and an outlet 140 which are in flow communication with a fluid reservoir 142 for holding a supply of cooling fluid An electric pump 144 circulates the cooling fluid through a system of hoses 146 from the fluid reservoir 142 through the inner flow channel 136 of the electrode 104, 106 thereby forming a closed loop system. Depending on the level of heat to be dissipated, the amount of cooling fluid flowing through the inner flow channel 136 can be increased or decreased by adjusting the pump speed 140. It should now be understood to those skilled in the art that any heat buildup in the electrodes would be effectively minimized by the cooling fluid. In a preferred embodiment of the invention, the electrodes 104, 106 can include a conventional temperature sensor (not shown) which can provide a temperature signal to the microprocessor 114 for automatically increasing or decreasing the flow of cooling fluid to the electrodes 104, 106 to maintain their temperature within a predefined temperature range. In another preferred embodiment of the invention, as shown in FIG. 7, the electrodes 104, 106 can be provided with at least one cooling fin 148 which operate to aid in minimizing any heat buildup in the electrodes 104, 106.

To understand how the parts above described are interrelated, the operation of the brazing apparatus 100 will now be described. During the brazing process, a fusible material is inserted along the high resistance interface between the work pieces 10, 12 in order to wet the surfaces along the interface and to ensure dissolution of any oxides that may be formed during the brazing operation. A low voltage, high electric current flow is then used to rapidly heat the interface causing the fusible material to melt, then consolidate and cool to form a brazed joint. By properly selecting the brazing temperature and programming the microprocessor 114 to monitor and control the temperature along the interface between the work pieces 10, 12, the fusible material can be melted to wet the entire surface along the interface while maintaining the melting temperature of the fusible material below the melting temperature of the work pieces 10, 12 being joined. During the brazing operation, the electrodes 104, 106 are first electrically attached to the work pieces 10, 12. The microprocessor 114 is then started which in turn activates the solid state relays 112, 124, 130, 132 to complete the electric circuit between the electric power source 18 and the electrodes 104, 106 to provide a low voltage, high amperage electric flow to the electrodes 104 and 106 which brazes the work pieces 10, 12 together along the interface formed by their opposing ends 14, 16.

It should be understood that in another preferred embodiment of the invention, the brazing apparatus 100 could comprise a plurality of electrodes electrically attached to various positions along the work pieces 10, 12. The desired time duration of the electric resistance heating is determined by the user who can then program the microprocessor 114 to automatically terminate the brazing operation after a fixed amount of time or, if the sensed temperature of the interface between the work pieces 10, 12 exceeds the predefined temperature level, or can be manually control the brazing time and/or override the temperature limit.

It should now be apparent to those skilled in the art that the brazing apparatus of the present invention can include a plurality of electrodes to permit work pieces having variable dimensioned interface to be brazed together in a single operation.

It should also now be apparent to those skilled in the art that the brazing apparatus of the present invention can include a plurality of electrodes to permit a plurality of work pieces having different heat capacities, to be brazed together in a single operation.

Accordingly, the apparatus for performing the method of the subject invention provides a relatively inexpensive and effective means of brazing in a well defined localized area with a minimum amount of heating. In addition, it should now be understood to those skilled in the art that the apparatus of brazing of the subject invention greatly increases the type of parts that can be economically manufactured by brazing As should be apparent to those skilled in the art, the apparatus for brazing of the subject invention permits heating of the interface and the fusible material just above the melting point of the fusible material and cooling immediately after adequate flow and wetting has taken place. In this way, the formation of voids, microcracks, and brittle intermetallic compounds are eliminated or reduced Further, the formation of tensile residual stresses created in the work pieces from the brazing operation is also often eliminated or reduced Further, the cooling of the electrodes to dissipate heat build up in the electrodes operates to minimize any detrimental thermal effects to the work pieces.

Accordingly, the brazing apparatus of the present invention provides a low voltage, high current electric flow which can be used to braze work pieces formed from various materials together while monitoring and controlling the temperature along the interface between the work pieces. In this way the physical properties of the brazed joint are generally superior over joints formed by use of conventional brazing apparatus. In addition, it should now be understood by those skilled in the art that the brazing apparatus of the present invention also reduces or eliminates any adverse thermal effects caused by the heating of the electrodes.

While the apparatus described constitute preferred embodiments of the invention, it is to be understood that the invention is not limited to the precise apparatus, and that changes may be made therein without departing from the scope of the invention that is defined in the appended claims.

What is claimed is:

1. A brazing apparatus for brazing together at least two work pieces comprising:
   an electric connector for connecting to an electrical power source;
   at least two electrodes adapted for attaching to and providing electrical contact with the work pieces to be brazed together whereby one electrode is attached to a first work piece and the other electrode is attached to a second work piece such that electrical power can travel through and between all of the work pieces;
   means for converting the electric power being directed from the electrical power source into a low voltage, high current pulse directed to the work pieces; and
   a control system for controlling the time duration of the brazing operation and for monitoring and controlling the brazing temperature being generated along the interface between the work pieces.

2. The brazing apparatus of claim 1 further comprising means for permitting the user to manually control the time duration of the brazing operation.

3. The brazing apparatus of claim 1 further comprising means for permitting the user to manually control the brazing temperature being generated along the interface between the work pieces.

4. The brazing apparatus of claim 1 wherein said control system comprises a microprocessor for controlling the brazing operation.

5. The brazing apparatus of claim 1 further comprising means for cooling the electrodes.

6. The brazing apparatus of claim 1 wherein said electrodes are water cooled electrodes.

7. The brazing apparatus of claim 1 further comprises a plurality of electrodes for positioning along the work pieces to provide a uniformed brazing temperature along the interface between the work pieces.

8. A brazing apparatus for brazing together work pieces whereby a fusible material is positioned along the interface between at least two work pieces, the brazing apparatus comprising:
   an electric connector for connecting to an electric power source for providing electric power;
   at least two electrodes adapted for attaching to and providing electrical contact with the work pieces to be brazed together such that electric power can travel through all of the work pieces;
   a device for converting the electric power into a low voltage, high amperage electric flow; and
   a control system for controlling the flow of electric power to the electrodes such that heat is generated along the interface between the work pieces to cause the fusible material to melt;
   wherein said control system includes a temperature sensor for monitoring and automatically regulating the temperature along the interface between the work pieces being brazed together.

9. The brazing apparatus of claim 8 further comprises means for adjusting the current level of the electric flow when the temperature along the interface between the work pieces exceeds a predefined level.

10. The brazing apparatus of claim 8 further comprising means for permitting the user to manually control the time duration of the brazing operation.

11. The brazing apparatus of claim 8 further comprising means for permitting the user to manually control the brazing temperature being generated along the interface between the work pieces.

12. The brazing apparatus of claim 8 further comprising means for cooling the electrodes.

13. The brazing apparatus of claim 8 wherein said electrodes are water cooled electrodes.

14. The brazing apparatus of claim 8 wherein each said electrode includes a flow channel for receiving cooling fluid effective for minimizing heat buildup in the electrode.

15. The brazing apparatus of claim 14 wherein the brazing apparatus further comprises means for increasing or decreasing the supply of cooling fluid to each electrode.

16. The brazing apparatus of claim 8 further comprises a plurality of electrodes for positioning along the work pieces to provide a uniformed brazing temperature along the interface between the work pieces.

17. A method for brazing at least two work pieces together comprising the steps of:
   inserting a fusible material along the high resistance interface between the work pieces;
   defining a temperature level to be maintained along the interface during the brazing operation; and
   applying a low voltage, high electric current flow to rapidly heat the interface causing the fusible material to melt, then consolidate and cool to form a brazed joint;
   wherein the temperature along the interface is regulated by increasing or decreasing the current flow to maintain the temperature at the predefined level.

18. The method for brazing of claim 17 further comprising the step of terminating the brazing operation after a predefined time.

19. The method of brazing of claim 17 further comprising the step of applying a plurality of electrodes at various points along the work pieces and regulating the electric current flow to each electrode to provide the defined temperature level along the interface between the work pieces.

20. The method of brazing of claim 17 further comprising the step of cooling the electrodes.

* * * * *